US 6,640,275 B1

(12) United States Patent
Kincaid

(10) Patent No.: US 6,640,275 B1
(45) Date of Patent: Oct. 28, 2003

(54) SYSTEM AND METHOD FOR DATA TRANSFER BETWEEN BUSES HAVING DIFFERENT SPEEDS

(75) Inventor: Barton Blaine Kincaid, Princeton, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/470,076

(22) Filed: Dec. 22, 1999

(51) Int. Cl.$^7$ .............................................. G06F 13/00
(52) U.S. Cl. .................. 710/305; 710/307; 713/501
(58) Field of Search ...................... 710/305, 66, 313, 710/307, 100, 53; 709/227, 232; 370/282, 277, 359, 451, 462; 327/334; 713/501

(56) References Cited

U.S. PATENT DOCUMENTS

| | | | |
|---|---|---|---|
| 5,557,783 A | * | 9/1996 | Oktay et al. |
| 5,982,780 A | * | 11/1999 | Bohm et al. |
| 6,094,714 A | * | 7/2000 | Roe et al. |
| 6,101,565 A | * | 8/2000 | Nishtala et al. |
| 6,256,320 B1 | * | 7/2001 | Tang et al. |

\* cited by examiner

Primary Examiner—Gopal C. Ray
(74) Attorney, Agent, or Firm—Steubing McGuinness & Manaras LLP

(57) ABSTRACT

A system for maintaining data flow between buses is provided wherein the bandwidth of a first bus is less than the bandwidth of a second bus. The bandwidth of a bus is based on the clock speed of the bus and the bit width of the bus. The system includes a first bus having a first clock rate and a first bus-width, a second bus having a second clock rate and a second bus-width, and control logic. The control logic receives data from the first bus and transfers the data to the second bus. The control logic may comprise a set of storage devices selectively coupled to the first bus and the set of storage devices may be addressable memory. The control logic may further include a first bus control logic for writing data to the set of storage devices and a second bus control logic for reading data to from the set of storage devices.

37 Claims, 5 Drawing Sheets

SYSTEM AND METHOD FOR DATA TRANSFER BETWEEN BUSES HAVING DIFFERENT SPEEDS

FIELD OF INVENTION

This invention relates to computer systems, and more particularly to data transfer between buses.

BACKGROUND ART

In the design and development of ASICs (application specific integrated circuits) and FPGAs (field programmable gate arrays) maintaining high data bandwidth between buses which have different clock frequencies can prove problematic. Traditionally, to move data between a first bus having a clock speed which is higher than the clock speed of the second bus throttling or data pacing methods are used. Such a design is necessary because the bandwidth of the first bus is greater than the bandwidth of the second bus.

SUMMARY OF THE INVENTION

A system for maintaining data flow between buses is provided wherein the bandwidth of a first bus is less than the bandwidth of a second bus. The bandwidth of a bus is based on the clock speed of the bus and the bit width of the bus. The system includes a first bus having a first clock rate and a first bus-width, a second bus having a second clock rate and a second bus width, and control logic. The control logic receives data from the first bus and transfers the data to the second bus. The control logic may comprise a set of storage devices selectively coupled to the first bus and the set of storage devices may be addressable memory. The control logic may further include a first bus control logic for writing data to the set of storage devices and a second bus control logic for reading data from the set of storage devices. The data is written to the set of storage devices at the first clock rate of the first bus and read from the storage devices at the bus rate of the second bus.

In another embodiment, a flag bit which is coupled to the set of storage devices and is set when the set of storage devices is written to. The flag bit for a storage device provides indicia that the storage device is filled with data. In yet another embodiment, the system includes a multiplexor for selection of a path between the first bus and one storage device of the set of storage devices. The system also includes a demultiplexor for selecting a path between one storage device from the set of storage devices and the second bus.

In any of the embodiments the bus width of the second bus is a multiple of the bus width of the first bus. Additionally, the clock rate of the first bus is greater than the clock rate of the second bus. In still another embodiment, the set of storage devices comprises two or more sets of storage devices which may be written to in parallel.

BRIEF DESCRIPTION OF THE DRAWINGS

The foregoing features of the invention will be more readily understood by reference to the following detailed description taken with the accompanying drawings.

DETAILED DESCRIPTION OF SPECIFIC EMBODIMENTS

The term "bandwidth" as used in the following description and claim shall mean the total throughput of a bus which is measured by the bit-width of the bus multiplied by the clock speed of the bus. The term "register" shall refer to a group of contiguous memory locations for storing a data word. For example a register may store 8 bits/1 byte, 32 bits, 64 bits or any other number of bits of information.

Figure 1:
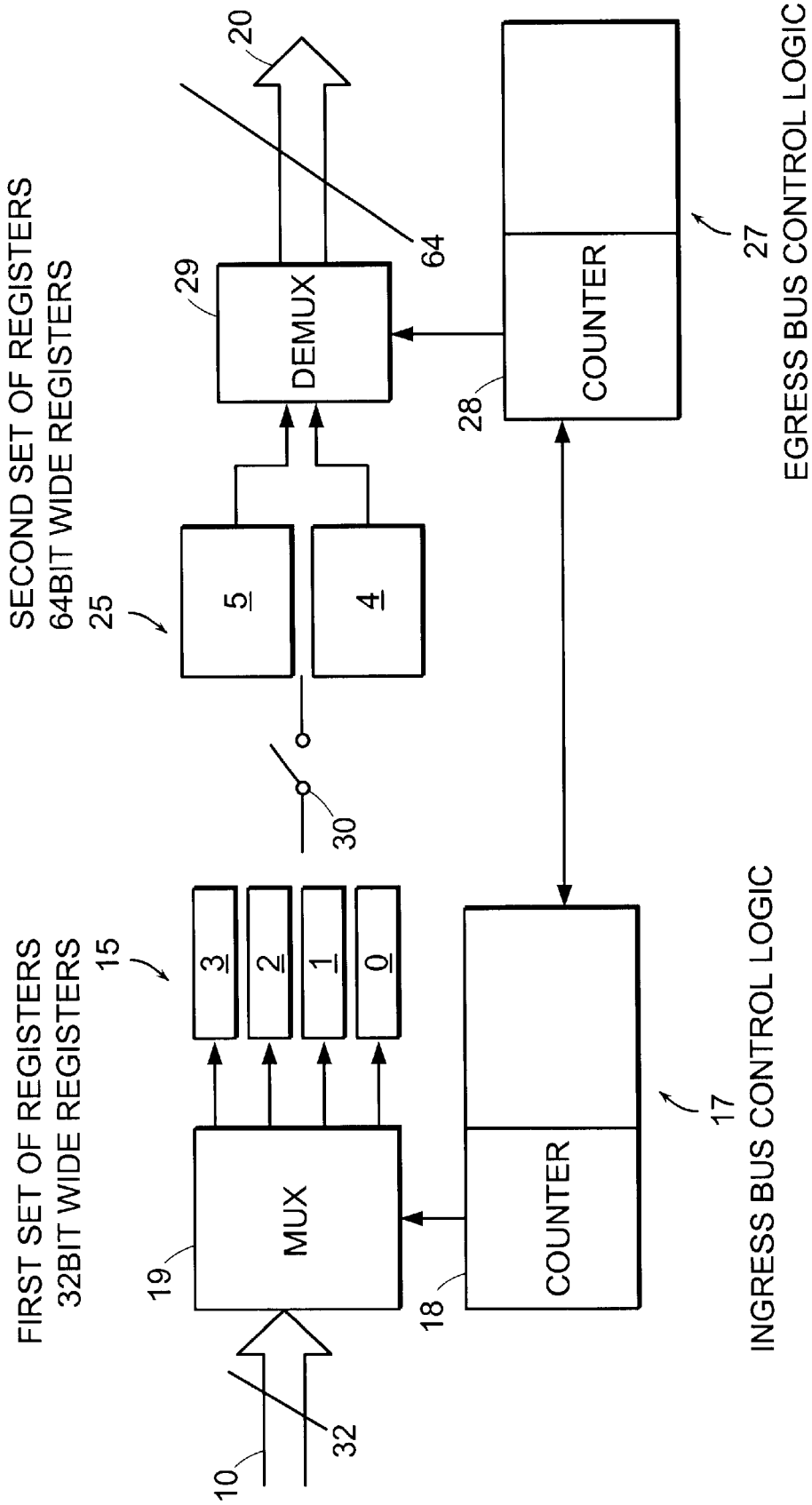
FIG. 1 is a block diagram of an embodiment of the invention for transferring data between buses having different clock speeds.

FIG. 1 is a block diagram of an embodiment of the invention for transferring data between buses having different clock speeds. This embodiment is applicable for use in FPGA(field gate programmable arrays) or ASIC (application specific integrated circuits) or any other electrical circuit having two buses in which data needs to be transferred from a bus with a higher clock rate to a bus with a lower clock rate. The apparatus includes a first bus 10 which is an ingress bus and a second bus 20 which is an egress bus. The bandwidth of the first bus is less than the bandwidth of the second bus. If the clock rate of the ingress bus 10 is higher than the clock rate of the egress bus 20, the bandwidth of the egress bus 20 may be kept higher than the bandwidth of the ingress bus 10 by having the bus width of the ingress bus be smaller than the bus width of the egress bus. In between the first and the second bus are two sets of registers. The first set of registers 15 is written to by ingress bus control logic 17 from the first bus 10 at the clock rate of the first bus 10 and the egress bus control logic 27 for the second bus 20 reads from the second set of registers 25 placing the data on the second bus at the clock rate of the second bus. Each register within the first set of registers 15 is preferably sized to the width of the first bus 10 and each register within the second set of registers 25 is preferably sized to the width of the second bus 20. The number of registers within each set of registers may be a multiple of the number of registers in the second set of registers.

Data is transferred from the ingress bus 10 to the egress bus 20 in the following manner. In the example that follows the ingress bus 10 is 32 bits wide and the egress bus 20 is 64 bits wide. It should be noted that these bus widths are used for exemplary purposes only and the invention may apply to any chosen bus width. A start signal is sent to the bus control logic which resets a counter 18 within the ingress bus control logic 17. That operation may occur at initialization or as the result of a reset control signal. The counter 18 is reset to zero which sends a control signal to a multiplexor 19 indicating that register zero is selected. A 32-bit data word is passed into register 0 and the counter is incremented to one. In such a fashion, the counter 18 is incremented each clock cycle of the first bus. This causes a control signal to be sent from the bus control logic 17 to the multiplexor 19 which switches the connection, so that register 1 receives the next 32-bit data word. The counter 18 is then incremented to two. When the counter 18 is incremented, a signal is sent from the ingress bus control logic 17 to a switch 30 between the first set of registers and the second set of registers. This causes the data in the 32-bit wide registers 0 and 1 to be transferred to the 64-bit wide register marked 4.

Additionally, when the counter 18 reaches two, the multiplexor 19 switches and connects the ingress bus 10 to register 2 and, as a result, data is placed in register 2. On the next clock cycle, the counter 18 is incremented to three, and a control signal is sent to the multiplexor 19. The multiplexor 19 receives the signal from the ingress bus control logic 17 and the multiplexor 19 connects the ingress bus with register 3. The data on the ingress bus 10 is then placed into this register.

When the counter resets to zero, a reset signal is sent to the egress control bus logic 27 from the ingress control bus logic 17 which causes the counter 28 of the egress bus logic 27 to be set to zero. When this counter 28 is set to zero, the egress control bus logic 27 sends a control signal to the demultiplexor 29. When the demultiplexor 29 receives this signal, it connects register 4 with the egress bus 20, causing the data from register 4 to be read onto the egress bus 20. At the same time, the ingress bus control logic 27 closes a switch between the 32-bit registers 2 and 3 and the 64-bit register marked 5. Thus, the data from the two 32-bit wide registers is passed to the single 64-bit wide register. As the counter 28 sequence progresses until the counter 28 again reaches two, a signal is sent to the egress bus control logic 27 and the demultiplexor 29 receives a signal which causes the path from register 5 to be connected with the egress bus. Simultaneously, the 32-bit registers 0 and 1 are passed to the 64-bit register 4. This process continues until an end of data signal is received into the ingress control logic 17 or the system is reset/reinitialized Alternatively, the egress bus control logic 27 does not receive a reset signal from the ingress bus control logic 17 where the counter 18 reaches zero, rather on each clock cycle of the egress bus 20, a counter 28 is incremented, which causes the control logic of the egress bus 27 to send a signal to the demultiplexor 29 and toggles the demultiplexor 29. At initialization of the system, the counter 28 of the egress control bus logic is set to zero, so that data is initially read from a register associated with a control signal of zero which in the example would be register 4. On the next clock cycle of the egress bus 20, the counter 28 is incremented and the demultiplexor 29 is toggled such that data is read from a register that is associated with a control signal of one, which in the example is register 5. This system for data transfer between buses having different speeds allows data to be transferred from an ingress bus with a higher frequency to an egress bus with a lower frequency without synchronization of the clock rates of the ingress and egress buses. This is accomplished by providing greater bandwidth at the egress bus than at the ingress bus.

It should be understood by those of ordinary skill in the art that the use of four registers in the first set of registers 15 and two registers in the second set of registers 25 are provided for exemplary purposes. Any number of registers may exist in the first set of registers 15, so long as the total number of registers is a multiple of the number of registers in the second set of registers 25. Also, the counters in the ingress and egress bus control logic may be configured in other manners, for example to decrement rather than increment, so long as the counters each provide a control signal to their respective multiplexor/demultiplexor. Additionally, it should be understood by those of ordinary skill in the art, that memory, such as random access memory, may be used in place of the registers, wherein the counter of the bus control logic would function to provide at least a portion of the address location of the bits within the random access memory.

Figure 2:
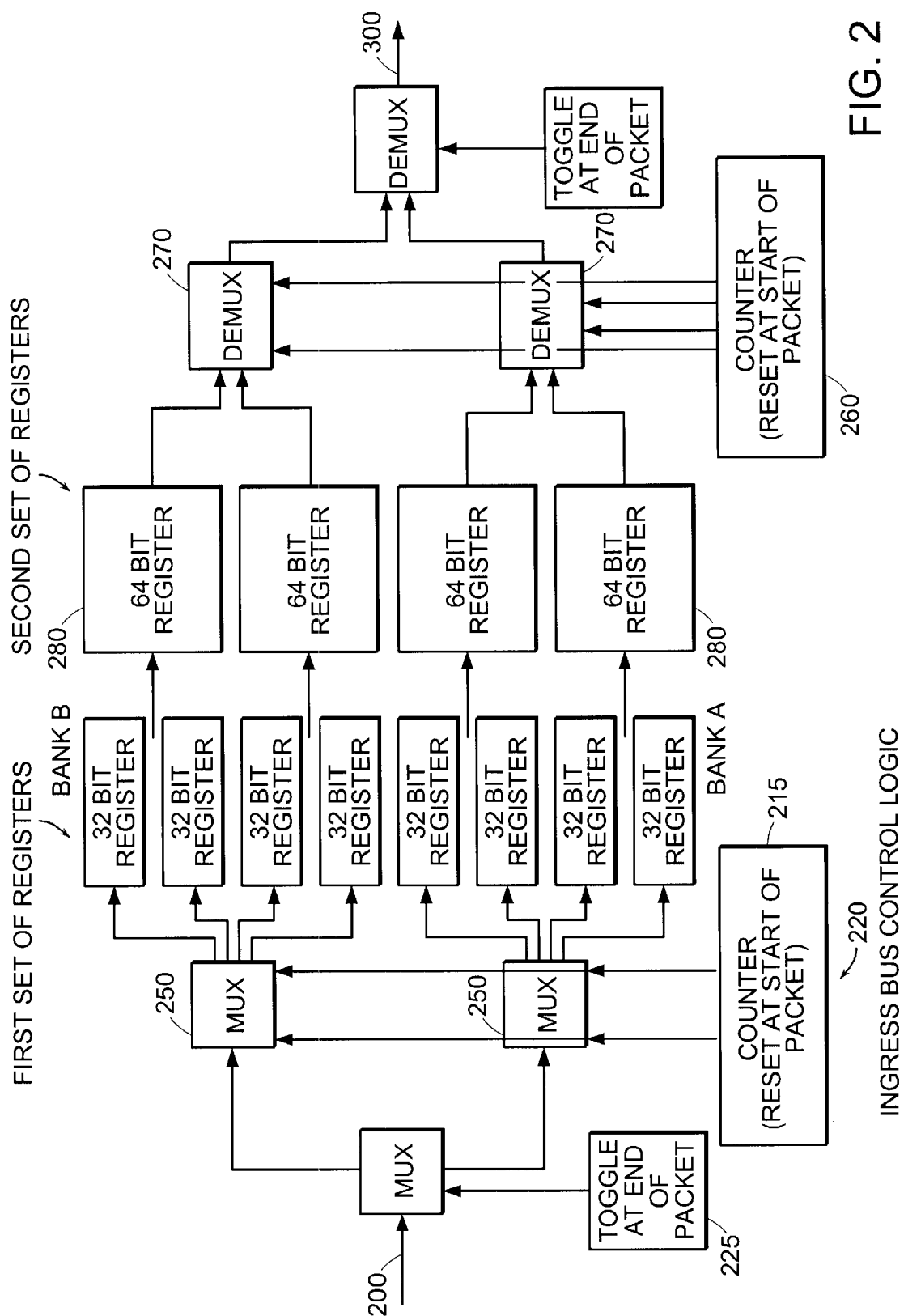
FIG. 2 is a block diagram in which multiple banks of registers are provided.

In an alternative embodiment as shown in FIG. 2 multiple banks of registers are used. In the example shown in FIG. 2, data from a 32-bit bus 200 is transferred onto a 128-bit bus 300. The ingress bus 200 operates at a clock rate of 100 Mhz and the egress bus 300 operates at a clock rate of 40 MHz. The bandwidth for the egress bus 300 is higher than the bandwidth for the ingress bus 200 (5.12 Gbits/sec. vs 3.2 Gbits/sec.), therefore the data can flow between buses without loss. The system of FIG. 2 could be used in a SONET (synchronous optical network). In SONET, each packet has a header which contains a parameter which indicates the beginning of data and a parameter which indicates the end of data. As such, the start of data parameter may be used to reset the counter 215 in the ingress bus control logic 220 and the end of packet parameter may be used as a toggling signal 225 to the first input multiplexor 240 between the secondary input multiplexors 250 which control access to each of the banks of registers. In FIG. 2, two banks of registers are shown, bank A and Bank B. The system of FIG. 2 operates in much the same way that FIG. 1 with the exception of data being toggled between the first bank of registers, Bank A, and the second bank of registers Bank B, and a counter 260 which counts for each clock cycle of the egress bus 300 signaling to demultiplexors 270 associated with a each of the 64 bit registers 280. In such an embodiment, a bank signal is required. This bank signal at the demultiplexors may be fixed or tied to a start of packet signal. This example should in no way be seen as a limitation on the number of banks of registers that may be used.

Figure 3:
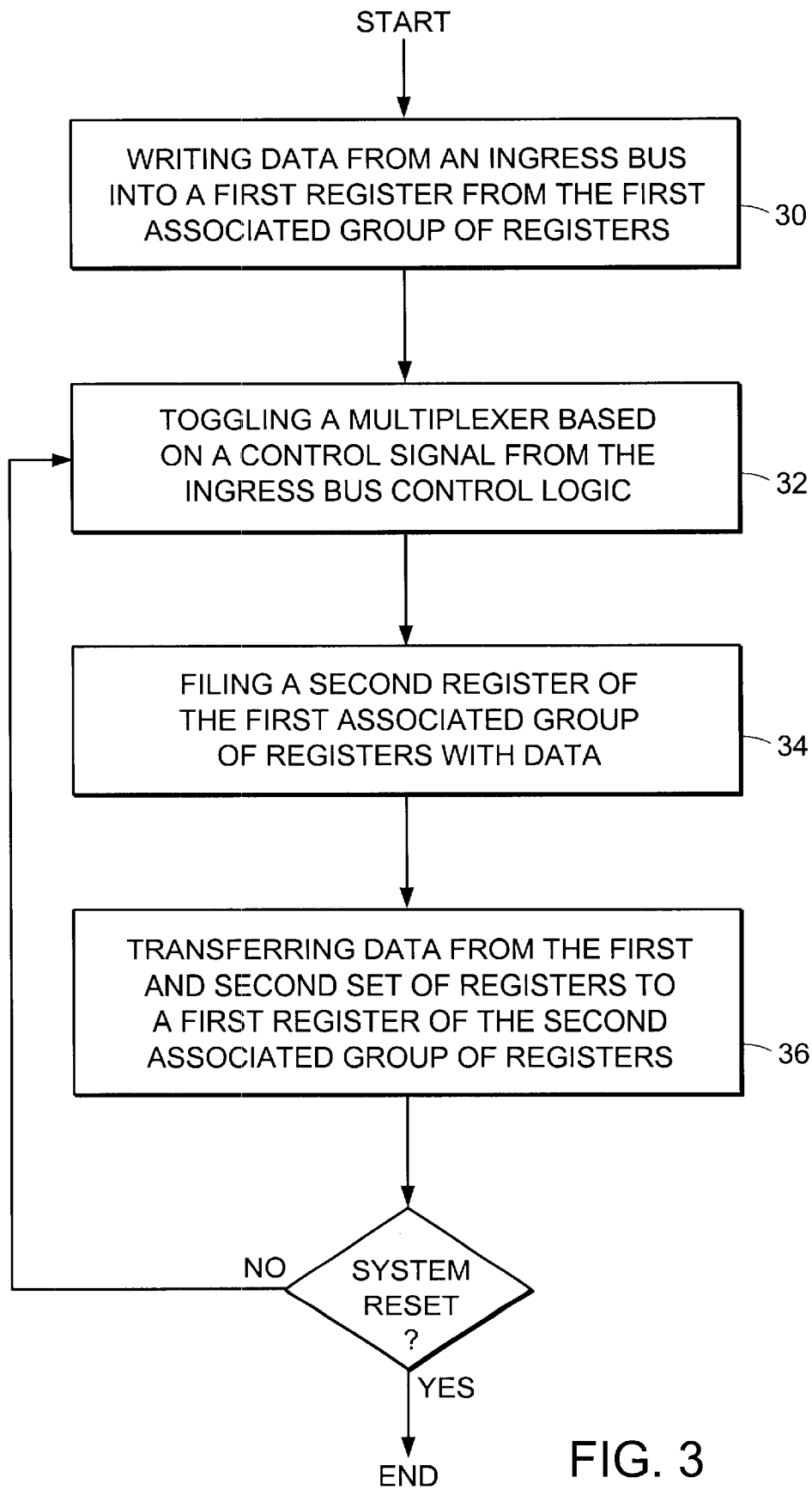
FIG. 3 shows a flow chart for sending data to the set of registers from the first bus and passing the data between a first associated group of registers to a second associated group of registers.

FIG. 3 shows a flow chart for sending data from an ingress bus and passing the data between a first associated group of registers to a second associated group of registers. Data is placed in ingress on the first bus (20). The bus has a given bus width and clock speed. For example the bus width may be 32 bits wide and operate at 100 MHz. The data is deposited at the ingress bus clock rate into a first register from the first associated group of registers (22). During each clock cycle, the ingress bus control logic writes a data word from the first bus to a register from the first associated group of registers (30). A counter which is associated with the ingress bus control logic is then incremented. The ingress bus control logic creates a control signal which is sent to a multiplexor (32). The multiplexor toggles to a new position in response to the control signal and a second register of the first associated group of registers is filed with 32 bits of data on the second clock cycle (34). The counter is, again incremented and the data from the first and second set of registers is transferred to a first register of the second associated group of registers where the register of the second group of associated registers has a size which is a multiple of the size of the first and second register of the first group of associated registers (36). In this examples the first register of the second group of associated registers is 64 bits in size and is twice the size of the registers of the first group of associated registers.

Figure 4:
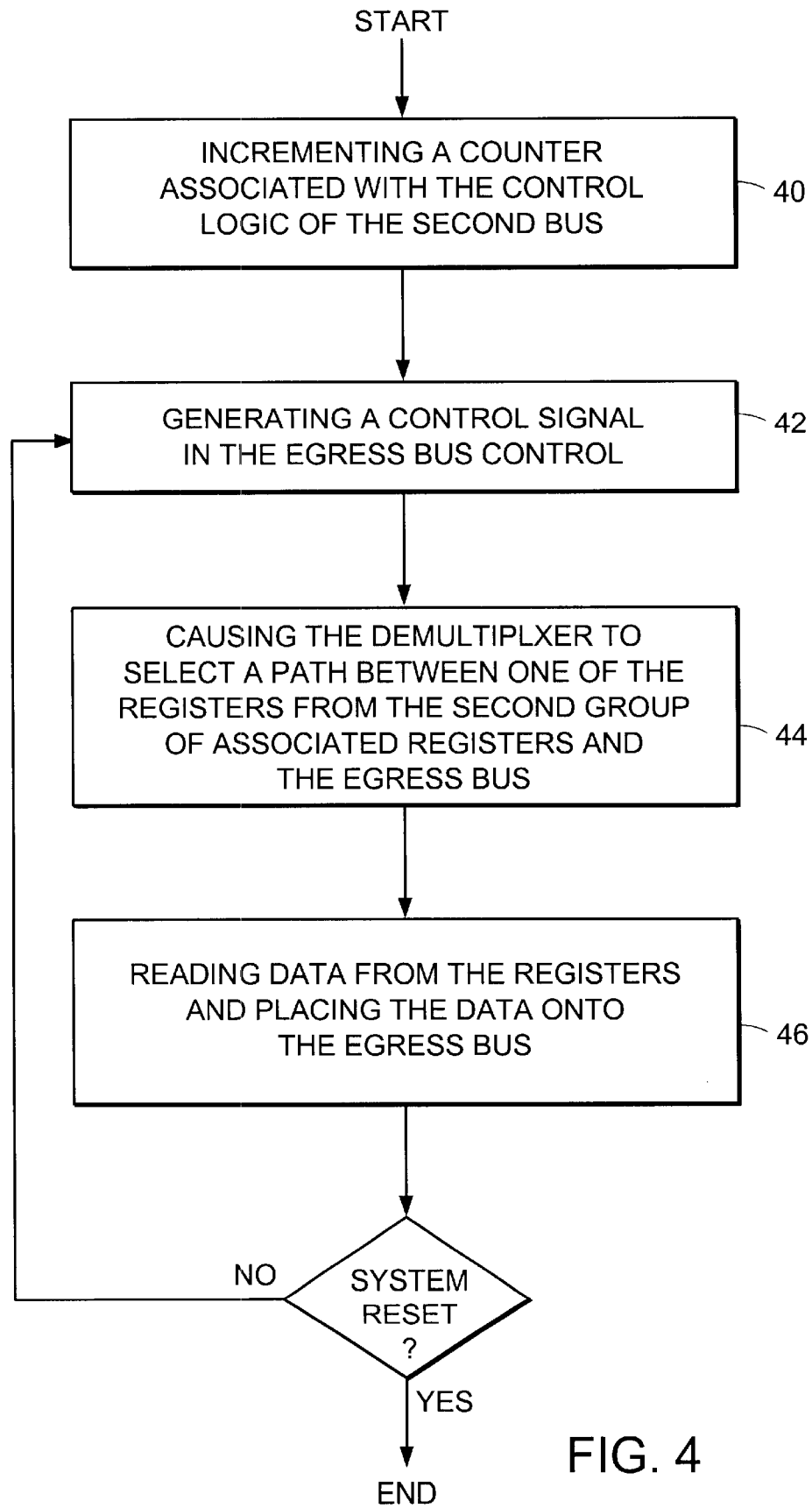
FIG. 4 shows a flow chart of the steps taken by the control logic of the second bus in reading the data from the second set of associated registers.

FIG. 4 shows a flow chart of the steps taken by the egress bus control logic in reading the data from the second set of associated registers. During each clock period of the egress bus, the control logic of the egress bus increments a counter (40). The incrementing of the counter causes a control signal to be generated in the egress bus control logic which is sent to a demultiplexor (42). The control signal causes the demultiplexor to select a path between one of the registers from the second group of associated registers and the egress bus. (44). Preferably the size of the second group of associated registers is the size of the width of the egress bus. Data is then read from the registers and placed onto the egress bus (46). The data which is read is equivalent to the width of the second bus. For example, if the second bus is 64 bits wide, data from the second associated group of registers which is equivalent to 64 bits of data is read onto the second bus. This process continues until the system is reset or an end of data signal is received by the egress bus control logic.

Figure 5:
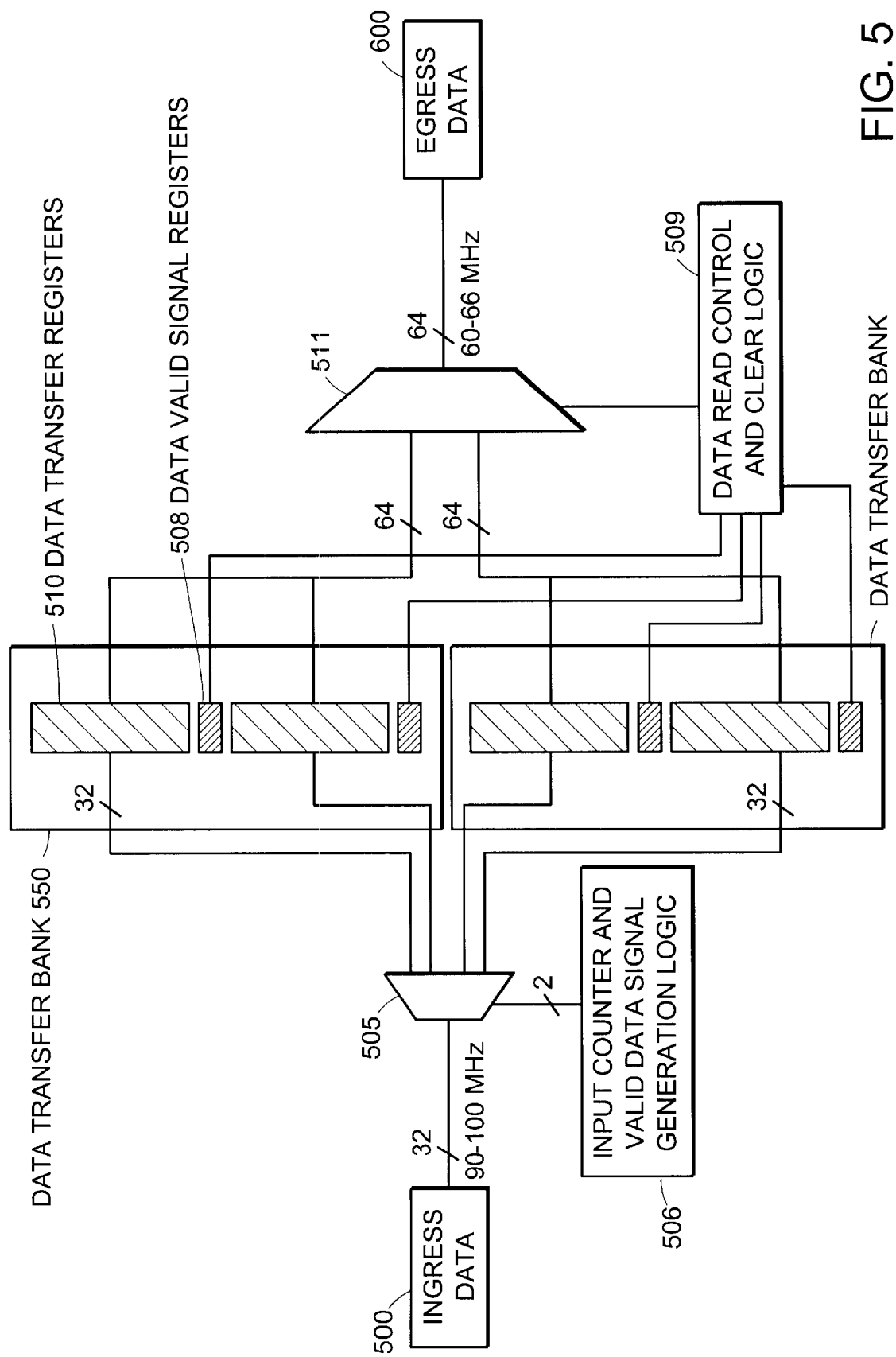
FIG. 5 is a schematic diagram of an alternative embodiment of the invention for transferring data between a bus clocked at a higher rate and a bus clocked at a lower rate.

FIG. 5 is a schematic diagram of a preferred embodiment of the invention for transferring data between a bus clocked at a higher rate 500 and a bus clocked at a lower rate 600. Ingress data from an ingress bus 500 enters a multiplexor 505 which forwards data to one of four data transfer registers 510. Four registers are presented for exemplary purposes and any number of registers may be used. In the embodiment presented in FIG. 5, the multiplexor 505 is 32 bits wide and each data transfer register 510 is 64 bits wide. The multiplexor 505 contains a counter 506 which keeps track of the number of data transfers that have been made to a given data transfer register 510. For example the counter will keep track of two data transfers as the data transfer registers 510 receives a total of 64 bits where each data transfer is composed of 32 bits. When the counter 506 reaches two data transfers, the multiplexor 505 routes the ingress data to the next appropriate data transfer register 510. In such a fashion, data is filled in the data transfer registers 510 in a round robin fashion. As each data transfer register 510 is filled with the first 32 bits a first bit of a data valid signal register 508 is set. On the next clock cycle, when the register 510 is completely filled, the second bit of the data valid signal register 508 is set. Data read control logic 509 accesses the data valid signal register and when both bits are set, the data read control logic 509 sends a control signal to a signal to be sent to the egress bus control logic (not shown). This signal indicates to the egress bus control logic that data from data transfer register may be read. The egress bus control logic causes data to be read out at the egress bus clock rate/frequency from the data transfer register which has the data valid signal register set. This is accomplished by sending a control signal to the demultiplexor 511 which cause a path to be formed between the valid data transfer register 510 and the egress bus 600. After the data is read, a clear signal is sent to the data valid signal register 508 which clears the registers and causes the egress bus control logic to send a control signal to the demultiplexor 511. When the data valid signal register 508 is cleared, the control signal to the demultiplexor toggles the state of the demultiplexor 511, so that data from the data transfer register 510 associated with the cleared data valid signal register 508 may not be transferred to the egress bus 600. Simultaneously, data from the ingress data path is passed through the multiplexor 505 and is written to the next data transfer register 510. The clear signal provides a means for preventing erroneous data from being read from the data transfer bank 550 if there are no data transfer registers 510 in the data transfer bank 550 which have been completely written to. Since each data transfer register 510 is read when there is valid data, by the time the ingress counter 506 has cycled around to the data transfer registers 510 again, the registers have been read and are available for new data to be written into them.

In an implementation in which there are multiple data transfer banks (not shown), the data transfer banks data may be written into the data transfer banks in a round robin fashion in order to decrease the chance of clock overlap and metastability. During the reading phase, the egress bus control logic chooses which data transfer bank from amongst the plurality of data transfer banks from which to read data.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A system for maintaining bandwidth, the system comprising:
    a first bus having a first clock rate and a first bus-width;
    a second bus having a second clock rate and a second bus-width; and
    control logic for receiving data from the first bus and transferring the data to the second bus, wherein the control logic comprises a set of storage devices selectively coupled to the first bus and a flag bit which is coupled to the set of storage devices and is set when the set of storage devices is written to.

2. The system according to claim 1, wherein the storage devices are addressable memory.

3. A system according to claim 1, wherein the control logic further comprises:
    a first bus control logic for writing data to the set of storage devices; and
    a second bus control logic for reading data from the set of storage devices.

4. The system according to claim 3, further comprising a multiplexor for selection of a path between the first bus and one storage device of the set of storage devices and a demultiplexor for selecting a path between one storage device from the set of storage devices and the second bus.

5. The system according to claim 1, wherein the data is written to the set of storage devices at the first clock rate of the first bus.

6. The system according to claim 1, further comprising a plurality of flag bits wherein a flag bit is associated with each storage device from the set of storage devices.

7. The system of according to claim 1, wherein the flag bit for a storage device provides indicia that the storage device is filled with data.

8. The system according to claim 1, wherein the bus-width of the second bus is a multiple of the bus-width of the first bus.

9. The system according to claim 1, wherein the clock rate of the first bus is greater than the clock rate of the second bus.

10. The system according to claim 1, wherein a storage device of the set of storage devices may be refilled once data from the storage device is passed to the second bus.

11. The system according to claim 1, wherein the first bus has a bandwidth which is less than a bandwidth of the second bus.

12. The system according to claim 1, wherein the bus-width of the first bus is less than the bus-width of the second bus.

13. The system according to claim 1, wherein a bit-width of the set of storage devices is greater than the first bus width.

14. The system according to claim 1, wherein the set of storage devices comprises two or more sets of storage devices which may be written in parallel.

15. The system according to claim 14, further comprising:
    a third bus having a third clock rate and a third bus-width where data may be read from one of the set of storage devices.

16. The system according to claim 15, wherein the third clock rate is identical to the second clock rate.

17. A method for transferring data between a first bus and a second bus, wherein the first bus has a first clock rate and the second bus has a second clock rate, wherein the first clock rate is greater than the second clock rate, the method comprising:
    writing data from the first bus to a set of storage devices at the clock rate of the first bus, wherein the data written is equivalent in size to a portion of the width of the second bus, including setting a flag bit, coupled to the set of storage devices, when the set of storage devices is written to; and reading the data at the second clock rate from the set of storage devices to the second bus.

18. A method for transferring data between a first bus with a first clock rate and a second bus with a second clock rate, the method comprising the steps of:

writing data from the first bus to a newly selected storage device from a first set of storage devices each clock cycle of the first bus;

setting a flag when data is placed in a threshold storage device in the first set of storage devices; and after the flag is set to a predetermined value, reading the data from the first set of storage devices into the second bus at the second clock rate;

wherein a bandwidth of the second bus is greater than a bandwidth of the first bus.

19. The method according to claim 18, further comprising:

writing data to a second set of storage devices from the first bus at the first clock rate after the flag is set; and reading data from the second set of storage devices onto the second bus at the second clock rate.

20. The method according to claim 19, further comprising:

setting a second flag when a predetermined storage device is written to from the second set of storage devices.

21. The method according to claim 18, wherein the storage devices are registers.

22. A system for transferring data between buses, the system comprising:

a first bus having a first clock rate and a first bus width;

a second bus having a second clock rate and a second bus width;

a first set of storage devices having a plurality of storage devices wherein each storage device has a width;

a second set of storage devices coupled to the first set of storage devices for transferring data, the second set of storage devices having at least one storage device wherein each storage device has a width and wherein the width of each storage device of the second set of storage devices is at least twice the width of each storage device of the first set of storage devices;

a first multiplexor coupling the first bus with the first set of storage devices; and a second multiplexor coupling the second bus with the second set of storage devices;

wherein a bandwidth of the first bus is less than a bandwidth of the second bus.

23. The system according to claim 22, wherein the data is transferred from the first set of storage devices to the second set of storage devices at the first clock rate of the first bus.

24. The system according to claim 22, wherein the bus width of the second bus is a multiple of the bus width of the first bus.

25. The system according to claim 22, wherein the width of each storage device of the second set of storage devices is a multiple of each storage device from the first set of storage devices.

26. The system according to claim 22, wherein the clock rate of the first bus is greater than the clock rate of the second bus.

27. The system according to claim 22, wherein the first set of storage devices comprises two or more sets of storage devices and the second set of storage devices comprises two or more sets of storage devices.

28. A method for transferring data between a first bus and a second bus wherein the first bus has a first clock rate and the second bus has a second clock rate, wherein the first clock rate is greater than the second clock rate, the method comprising:

writing a first set of storage devices with data from the first bus;

filling a second set of storage devices with data from the first bus at the first clock rate when the first set of storage devices are filled to a preset point; and transmitting the data at the second clock rate from the second set of storage devices to the second bus as the first set of storage devices are being filled;

wherein a bandwidth of the second bus is greater than a bandwidth of the first bus.

29. A system for transferring data between a first bus having a width and a clock rate and a second bus having a width and a clock rate, wherein the clock rate of the first bus is greater than the clock rate of the second bus, the system comprising:

a first set of storage devices, composed of a plurality of storage devices;

a first multiplexor responsive to a control signal for creating a path between the first bus and one of the storage devices from the first set of storage devices;

a first bus control logic sending a control signal to the first multiplexor at the clock rate of the first bus;

a second set of storage devices, composed of one or more storage devices;

a second multiplexor responsive to a control signal for creating a path between one of the storage devices from the second set of storage devices and the second bus; and a second bus control logic sending a control signal to the second multiplexor at the clock rate of the second bus.

30. A system according to claim 29, wherein each storage device of the first set of storage devices is sized to the width of the first bus.

31. A system according to claim 30, wherein each storage device of the second set of storage devices is sized to the width of the second bus.

32. A system according to claim 31, wherein the width of the second bus is larger than the width of the first bus.

33. A system according to claim 32, wherein a bandwidth of the first bus is greater than a bandwidth of the second bus.

34. A system for transferring data between a first bus with a first clock rate and a second bus with a second clock rate, the system comprising:

means for writing data from the first bus to the newly selected storage device from a first set of storage devices each clock cycle of the first bus;

means for setting a flag when data is placed in a threshold storage device in the first set of storage devices; and means for reading from the first set of storage devices onto the second bus at the second clock rate after the flag is set to a predetermined value.

35. The system according to claim 34, further comprising:

means for writing data to a second set of storage devices from the first bus at the first clock rate after the flag is set; and means for reading data from the second set of storage devices onto the second bus at the second clock rate.

36. The system according to claim 35, further comprising:

means for setting a second flag when a predetermined storage device is written to from the second set of storage devices.

37. The system according to claim 34, wherein the storage devices are registers.

* * * * *